Figure 1:
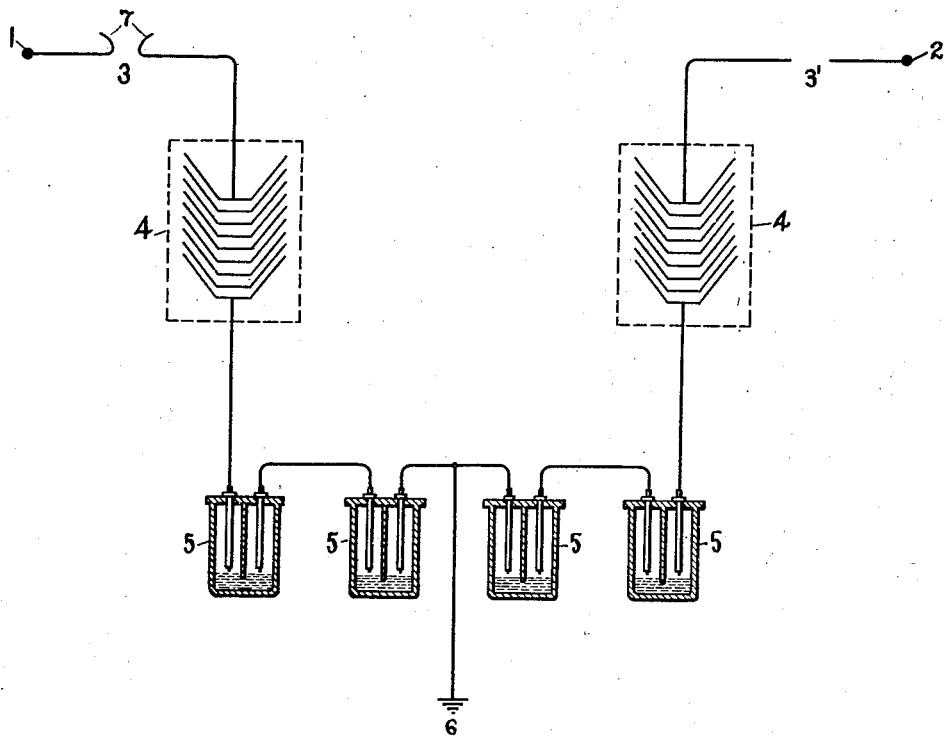

E. E. F. CREIGHTON.
LIGHTNING ARRESTER.
APPLICATION FILED JULY 9, 1907.

1,004,531.

Patented Sept. 26, 1911.

Witnesses
Irving E. Steere.
J. Ellis Glim

Inventor
Elmer E. F. Creighton
by Albert G. Davis
Atty.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

1,004,531.  Specification of Letters Patent.  Patented Sept. 26, 1911.

Application filed July 9, 1907. Serial No. 382,861.

*To all whom it may concern:*

Be it known that I, ELMER E. F. CREIGHTON, a citizen of the United States, residing at Schenectady, county of Schenectady, State of New York, have invented certain new and useful Improvements in Lightning-Arresters, of which the following is a specification.

This invention relates to devices for protecting transmission lines from the destructive effect of the dynamic current following a discharge of high potential across a grounded spark-gap. Ordinarily goat horns have been used at the gap to draw out the arc until it is extinguished. The objections to goat horns are that they occupy space; they produce a long, flaring, dangerous arc; and they consume a relatively long time in extinguishing the arc,—from one to three seconds.

The object of my invention is to shorten the horns or entirely dispense with them, and also to shorten the time of extinguishing the arc to a fraction of a second; one-half a cycle, in fact. I accomplish this by a combination of electrolytic condensers and liquid electrode lightning arresters in the manner hereinafter set forth and particularly pointed out in the claims.

In a previous application, Serial Number 325,195, I have disclosed a type of lightning arrester comprising a series of aluminum dishes or cells nested together and filled with a suitable electrolyte, and connected in series between line and ground through a spark-gap. When the dynamic current following a high potential discharge across the spark-gap flows through this device, an electrolytic action is set up which forms a film of oxid or hydroxid of aluminum on the submerged portions of the cells. The operation of forming this film absorbs so much of the energy of the dynamic current, and the film when formed offers such a high resistance, that the current is choked back, so that the arc at the spark-gap is unable to persist. The total resistance of this electrolytic condenser depends upon the number of cells in circuit. The "critical voltage", at which the film breaks down and permits a free passage of the current so long as this voltage is exceeded, depends upon the electrolyte used. In another application, Serial Number 358,777, I have disclosed a lightning arrester in which a liquid electrode is used, whose surface is close to two metallic electrodes connected respectively to line and to ground. This form of arrester has a critical voltage of many hundred volts varying with the electrolyte used, though above said voltage current will pass freely. In the present application, I combine these two forms of apparatus. The aluminum cell arrester is so proportioned that its critical voltage is only slightly above that of the normal line voltage. It is thus a current-limiting device, but it will not extinguish an arc because its margin of current control is so slight. When a spark takes place across a gap in series with such a cell, the current will continue to flow unless some auxiliary device be used, capable of extinguishing the arc. The objections to the horn arrester have been already stated. I use instead one or more liquid electrode arresters, and if enough of them are connected in series there will be no necessity of using horns at all. The liquid electrode arrester is here employed solely as an arc extinguishing device; not as both a current-limiting and arc extinguishing device as in application Serial Number 358,777.

Figure 2:
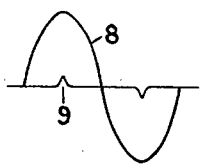
Figure 3:
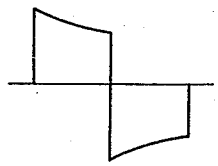

In the accompanying drawing, Figure 1 is a diagram of circuits showing my invention; Fig. 2 is a diagram showing the current flowing through the liquid electrode arrester at the peak of the dynamic current wave; and Fig. 3 shows the potential across the aluminum cell between the two values of current shown in Fig. 2.

Let 1 and 2 represent two conductors of an alternating current transmission line. Each conductor is connected through a spark-gap 3, 3′ with an electrolytic condenser, such as the aluminum cell arrester 4. In series with this condenser is one or more liquid electrode arresters 5; a ground connection being provided at 6. The spark-gap may be provided with short horns 7, or be a simple needle-gap, as at 3′, according to the number of liquid electrode cells installed.

The total voltage between conductor and conductor divided by the number of liquid electrode cells should have a value at least equal to the critical value of one liquid electrode cell, and ordinarily should be considerably above said critical value because the aluminum cells absorb part of the dynamic potential. If the liquid electrode arrester is installed as shown in Fig. 1, it can be made to hold back the dynamic current, except at peak value. An oscillogram of such a discharge is shown in Fig. 2 in which curve 8 is the dynamic potential and curve 9 is the current flowing only at peak value. This is the effect which it is desired to obtain by the use of the liquid electrode cell in series. If the dynamic current can exist only at peak value across the gap 3, the arc will be extinguished by cooling, so that it will not reappear at the next half cycle. It should be noted in this case that the arrester sparks initially as a single gap arrester but the dynamic current is extinguished as a multi-gap arrester. In Fig. 3 is shown the potential across the aluminum cells between the two values of current shown in Fig. 2. The potential drops slightly due to the leakage of the charge through the film of the aluminum cell.

What I claim as new and desire to secure by Letters Patent of the United States, is,—

1. The combination with the conductors of a transmission line, of an electrolytic device for absorbing part of a dynamic current, and one or more devices in series adapted to interrupt the current except when the latter is near its peak value.

2. The combination with the conductors of a transmission line, of a series spark-gap, an electrolytic condenser, and a liquid electrode arrester in series therewith, the latter being carried at or above its critical voltage.

3. The combination with the conductors of a transmission line, of a connection between said conductor and ground containing a spark-gap, an aluminum cell arrester adapted to absorb part of the dynamic current following a discharge of abnormal potential, and one or more liquid electrode arresters, the value of the normal line voltage divided by the number of liquid electrode cells being above the critical voltage of a single cell.

4. The combination with the conductors of a transmission line, of a protective device comprising a spark-gap, an electrolytic condenser having a critical voltage slightly above the potential of the line, and a liquid electrode arrester having a critical voltage below the line potential, all in series.

5. The combination with the conductors of a transmission line, of an electrolytic condenser having a critical voltage slightly above the line potential and a liquid electrode arrester in series therewith having a spark gap with an electrolytic cathode and having a critical voltage below the line potential.

In witness whereof, I have hereunto set my hand this 3rd day of July, 1907.

ELMER E. F. CREIGHTON.

Witnesses:
BENJAMIN B. HULL,
HELEN ORFORD.